(12) United States Patent
Sato

(10) Patent No.: US 10,867,751 B2
(45) Date of Patent: Dec. 15, 2020

(54) CAPACITOR

(71) Applicant: Panasonic Intellectual Property Management Co., Ltd., Osaka (JP)

(72) Inventor: Shinya Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 142 days.

(21) Appl. No.: 16/223,165

(22) Filed: Dec. 18, 2018

(65) Prior Publication Data

US 2019/0122821 A1    Apr. 25, 2019

Related U.S. Application Data

(63) Continuation of application No. PCT/JP2017/024929, filed on Jul. 7, 2017.

(30) Foreign Application Priority Data

Jul. 21, 2016   (JP) .................................. 2016-143780

(51) Int. Cl.
*H01G 4/228* (2006.01)
*H01G 4/224* (2006.01)
*H01G 4/18* (2006.01)

(52) U.S. Cl.
CPC ............. *H01G 4/228* (2013.01); *H01G 4/224* (2013.01); *H01G 4/18* (2013.01)

(58) Field of Classification Search
CPC ........... H01G 4/228; H01G 4/224; H01G 4/18
See application file for complete search history.

(56) References Cited

U.S. PATENT DOCUMENTS 6,348,662 B1      2/2002   Kobayashi
2010/0202096 A1*  8/2010   Iyer .................... H01G 4/35
                                                    361/302

(Continued)

FOREIGN PATENT DOCUMENTS

CN          1264947 A      8/2000
CN          104769814 A    7/2015

(Continued)

OTHER PUBLICATIONS

International Search Report of PCT application No. PCT/JP2017/024929 dated Oct. 10, 2017.

(Continued)

*Primary Examiner* — David M Sinclair
(74) *Attorney, Agent, or Firm* — McDermott Will & Emery LLP

(57) ABSTRACT

A capacitor includes a capacitor element, a bus bar, and a case. The bus bar is electrically connected to the capacitor element. The capacitor element and the bus bar are accommodated in the case. The case has a protrusion. The bus bar includes a fitting part into which the protrusion is fitted, and has a first surface facing the case and a second surface opposite to the first surface. The fitting part includes a through hole that passes through from the first surface to the second surface, and a cylindrical flange part surrounding the through hole. The cylindrical flange part is disposed on the second surface so as to rise from a peripheral edge of the through hole.

2 Claims, 4 Drawing Sheets

(56) References Cited

U.S. PATENT DOCUMENTS

2015/0229178 A1     8/2015   Murakami et al.
2018/0233285 A1*   8/2018   Sato ........................ H01G 2/04

FOREIGN PATENT DOCUMENTS

| JP | 1-173516 | | 7/1989 |
|----|----------|---|--------|
| JP | 2001-210546 | | 8/2001 |
| JP | 2001210546 A | * | 8/2001 |
| JP | 2006-216756 | | 8/2006 |
| JP | 3816134 B2 | * | 8/2006 |
| JP | 2009170756 A | * | 7/2009 |
| JP | 2010129573 A | * | 6/2010 |
| JP | 2010182914 A | * | 8/2010 |
| WO | WO-2018170872 A1 | * | 9/2018 |

OTHER PUBLICATIONS

English Translation of Chinese Search Report dated Jun. 18, 2020 for the related Chinese Patent Application No. 201780043958.0.

\* cited by examiner

CAPACITOR

RELATED APPLICATIONS

This application is a continuation of the PCT International Application No. PCT/JP2017/024929 filed on Jul. 7, 2017, which claims the benefit of foreign priority of Japanese patent application No. 2016-143780 filed on Jul. 21, 2016, the contents all of which are incorporated herein by reference.

BACKGROUND

1. Technical Field

The present disclosure relates to capacitors.

2. Description of the Related Art

Unexamined Japanese Patent Publication No. 2001-210546 discloses a capacitor whose opening is sealed by resin. In this capacitor, a capacitor element in which electrode lead-out portions are formed on both end surfaces of the capacitor element and terminals (bus bars) are connected to the electrode lead-out portions is accommodated in a resin case. The resin case is filled with an insulative resin. Protruding parts serving as positioning parts are provided on an end surface of the opening of the resin case, and through holes serving as fitting parts are formed in the terminals so as to fit the protruding parts into the through holes, respectively.

SUMMARY

A capacitor according to a first aspect of the present disclosure includes a capacitor element, a bus bar, and a case. The bus bar is electrically connected to the capacitor element. The capacitor element and the bus bar are accommodated in the case. The case has a protrusion. The bus bar includes a fitting part into which the protrusion is fitted, and has a first surface facing the case and a second surface opposite to the first surface. Herein, the fitting part includes a through hole that passes through from the first surface to the second surface, and a cylindrical flange part surrounding the through hole. The cylindrical flange part is disposed on the second surface so as to rise from a peripheral edge of the through hole.

The present disclosure provides a capacitor capable of positioning a bus bar while securing a cross-sectional area of the bus bar.

Effects or meanings of the present disclosure will be further clarified in the following description of an exemplary embodiment. However, the following exemplary embodiment is illustrative only for implementation of the present disclosure, and the present disclosure is not at all limited to the following exemplary embodiment.

DETAILED DESCRIPTION OF EMBODIMENT

Figure 1A:
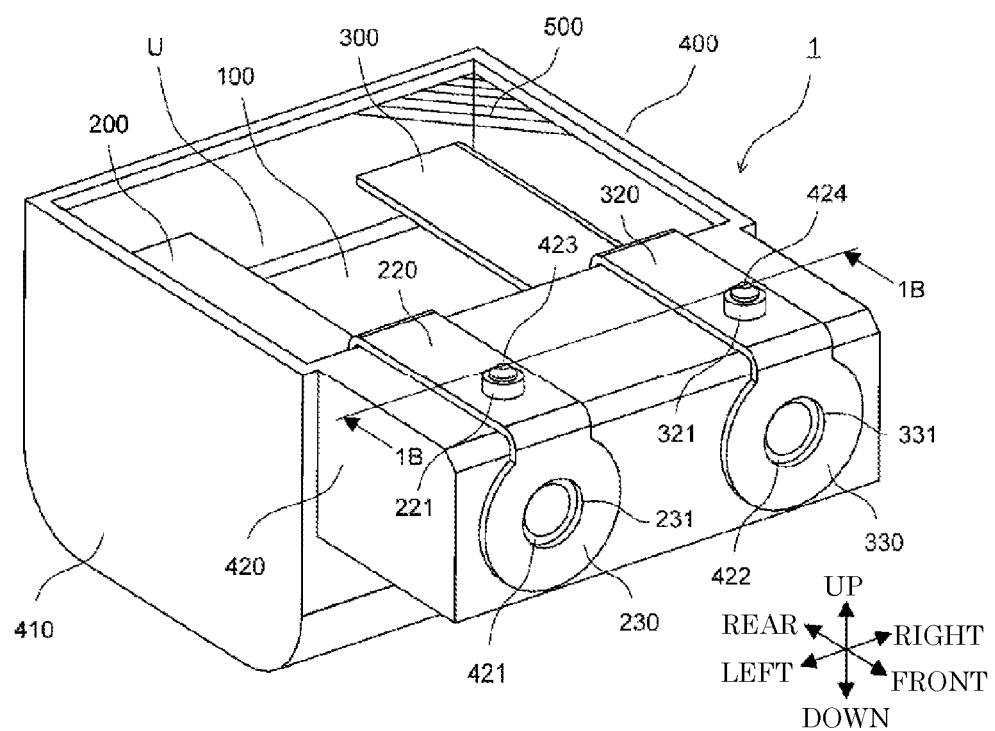
FIG. 1A is a front perspective view illustrating a film capacitor according to an exemplary embodiment.

Prior to describing an exemplary embodiment of the present disclosure, a problem found in a conventional capacitor will be briefly described.

In the capacitor disclosed in Unexamined Japanese Patent Publication No. 2001-210546, at a position where the through hole is formed, a cross-sectional area of each terminal in a plane parallel with its width direction (a direction perpendicular to a current flowing direction) is decreased by an area corresponding to the through hole. This may cause an electric resistance value of the terminal increases at the position where the through hole is formed. Therefore, it is apprehended that a current is difficult to flow through the terminal due to the through hole.

To solve such a problem, the present disclosure provides a capacitor capable of positioning a bus bar while securing a cross-sectional area of the bus bar.

With reference to the accompanying drawings, film capacitor 1, which is an exemplary embodiment of a capacitor of the present disclosure, will be described below. For the sake of convenience, directions including front and rear, right and left, and up and down are added to the drawings as appropriate. These directions are not absolute directions but relative directions in relation to an orientation of film capacitor 1.

In the present exemplary embodiment, film capacitor 1 is an example of a "capacitor" recited in the appended claims. First end-surface electrode 110 and second end-surface electrode 120 are examples of an "electrode" recited in the appended claims. First bus bar 200 and second bus bar 300 are examples of "bus bars" recited in the appended claims. First protrusion 423 and second protrusion 424 are examples of a "protrusion" recited in the appended claims. First fitting part 221 and second fitting part 321 are examples of a "fitting part" recited in the appended claims. Lower surface 220*b* and upper surface 220*a* of first coupling part 220 are respectively examples of a "first surface" and a "second surface" recited in the appended claims. Lower surface 320*b* and upper surface 320*a* of second coupling part 320 are respectively examples of the "first surface" and the "second surface" recited in the appended claims. Upper surface 420*a* of terminal installation part 420 is an example of a "forming surface" recited in the appended claims.

However, the above description purely defines correspondences between constituents recited in the appended claims and constituents described in the exemplary embodiment. The correspondences are not intended to limit the scope of the disclosure in the appended claims to the configuration described in the exemplary embodiment.

Figure 1B:
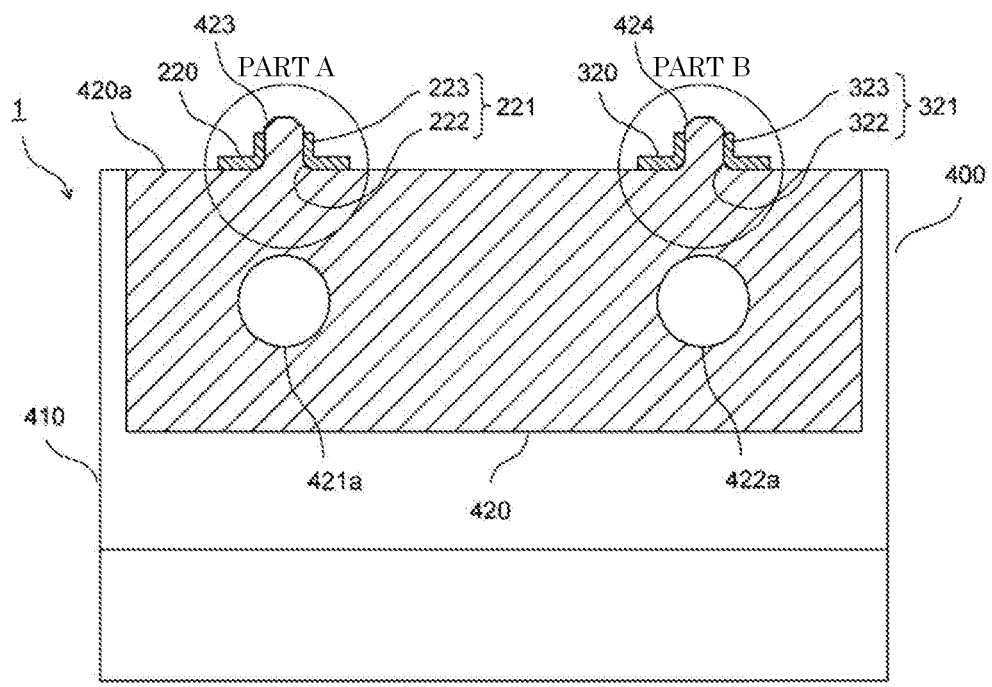
FIG. 1B is a front cross-sectional view taken along line 1B-1B in FIG. 1A.
Figure 2:
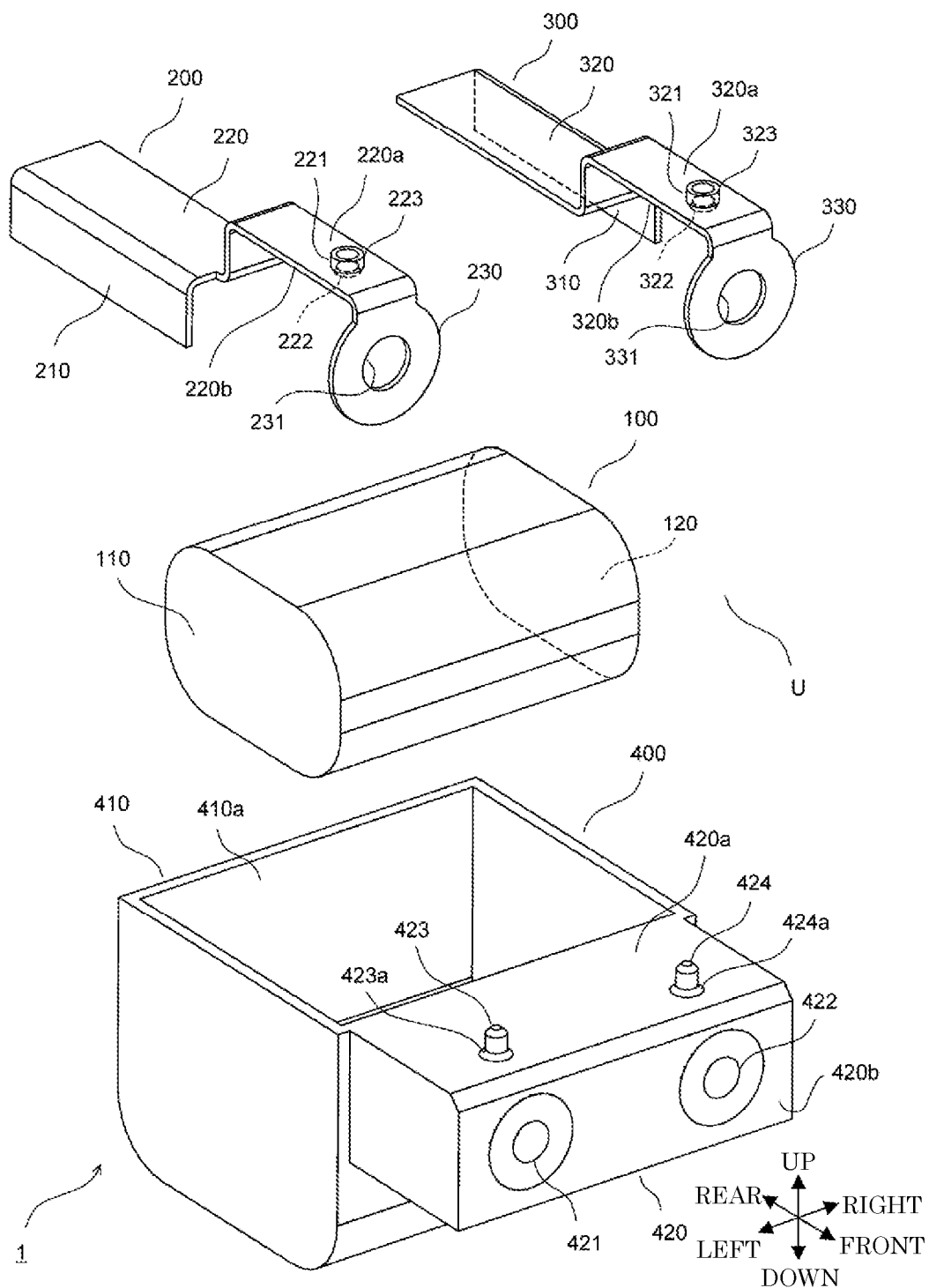
FIG. 2 is an exploded perspective view illustrating the film capacitor according to the exemplary embodiment.
Figure 3A:
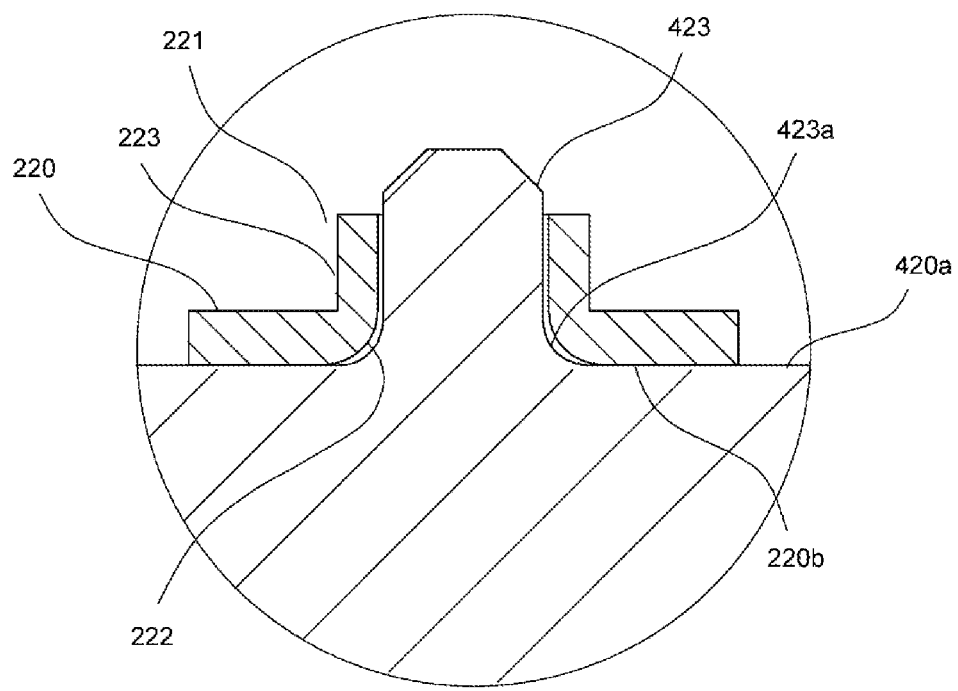
FIG. 3A is an enlarged cross-sectional view of part A in FIG. 1B.
Figure 3B:
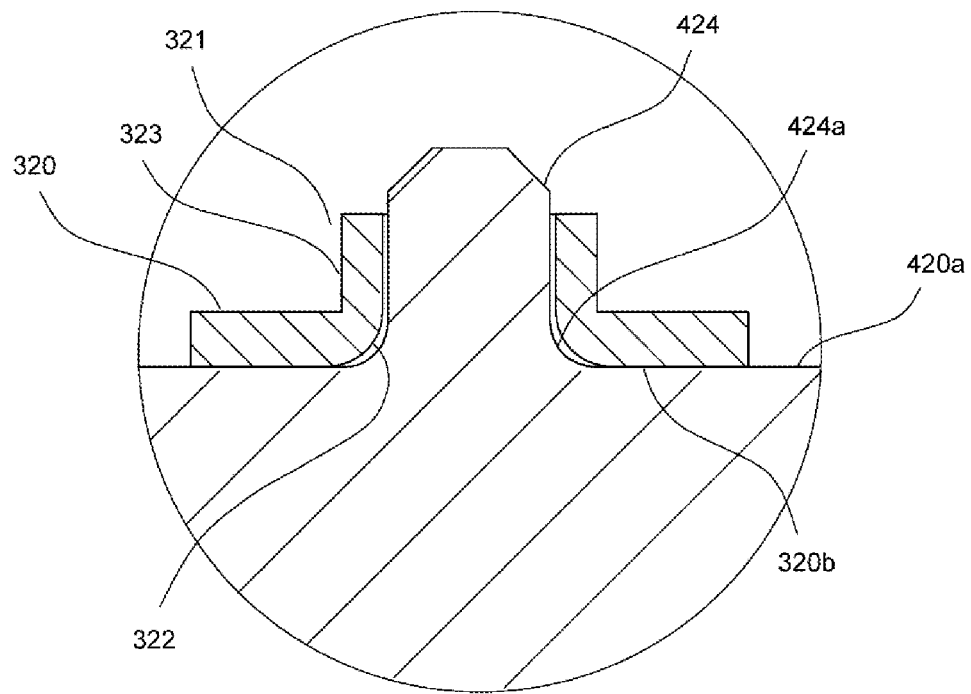
FIG. 3B is an enlarged cross-sectional view of part B in FIG. 1B.

FIG. 1A is a front perspective view illustrating film capacitor 1 according to the present exemplary embodiment, and FIG. 1B is a front cross-sectional view of film capacitor 1, according to the exemplary embodiment, taken along line 1B-1B in FIG. 1A. FIG. 2 is an exploded perspective view illustrating film capacitor 1 according to the present exemplary embodiment. FIG. 3A and FIG. 3B are respectively enlarged cross-sectional views of part A and part B in FIG. 1B. In FIG. 1A, a part of filling resin 500 is hatched, and the remaining part is transparent, for the sake of convenience.

Film capacitor 1 includes capacitor element 100, first bus bar 200, second bus bar 300, case 400, and filling resin 500. Capacitor element 100, first bus bar 200, and second bus bar 300 are assembled to constitute capacitor element unit U. Then, capacitor element unit U is put in case 400. Filling resin 500 is made of a thermosetting resin, is injected into case 400 in a melted state, and is cured by heating case 400. Filling resin 500 protects capacitor element unit U in case 400 against humidity or impact.

Capacitor element 100 is formed by stacking two metalized films that are dielectric films on which aluminum is deposited, winding or laminating the stacked metalized films, and pressing it to have a flat shape. In capacitor element 100, first end-surface electrode 110 is formed on a left end surface by spraying metal such as zinc, and similarly, second end-surface electrode 120 is formed on a right end surface by spraying metal such as zinc. Capacitor element 100 is accommodated in case 400 with both end surfaces directed in a right-left direction. Note that, although capacitor element 100 of the present exemplary embodiment is formed of metalized films that are dielectric films on which aluminum is deposited, capacitor element 100 may be formed of metalized films on which different metal such as zinc or magnesium is deposited. Alternatively, from among such metals, capacitor element 100 may be formed either from metalized films formed by depositing a plurality of metals or from metalized films formed by depositing an alloy of such metals.

First bus bar 200 is connected to first end-surface electrode 110 of capacitor element 100, and second bus bar 300 is connected to second end-surface electrode 120 of capacitor element 100. A current drawn from capacitor element 100 flows through first bus bar 200 and second bus bar 300.

First bus bar 200, which is made of a conductive material such as a copper plate, includes first electrode terminal part 210, first coupling part 220, and first connecting terminal part 230. First bus bar 200 is formed by, for example, cutting out and bending one copper plate as appropriate, and thus first electrode terminal part 210, first coupling part 220, and first connecting terminal part 230 are integrally formed.

First electrode terminal part 210 has a plate shape elongated along the right-left direction, covers first end-surface electrode 110 of capacitor element 100, and is electrically connected to first end-surface electrode 110 by a connection method such as soldering. First coupling part 220 couples first electrode terminal part 210 and first connecting terminal part 230. One end of first coupling part 220 extends forward along a peripheral surface of capacitor element 100, and the other end of first coupling part 220 extends upward and then extends forward by being bended at a substantially right angle. First connecting terminal part 230 has a circular plate shape, is formed so as to hang down from a front end of first coupling part 220, and has front and rear surfaces directed in a front-rear direction. Circular attachment hole 231 is formed in first connecting terminal part 230 so as to pass through both the front and rear surfaces.

Second bus bar 300, which is made of a conductive material such as a copper plate, includes second electrode terminal part 310, second coupling part 320, and second connecting terminal part 330. Second bus bar 300 is formed by, for example, cutting out and bending one copper plate as appropriate, and thus second electrode terminal part 310, second coupling part 320, and second connecting terminal part 330 are integrally formed.

Second electrode terminal part 310 has a plate shape elongated along the right-left direction, covers second end-surface electrode 120 of capacitor element 100, and is electrically connected to second end-surface electrode 120 by a connection method such as soldering. Second coupling part 320 couples second electrode terminal part 310 and second connecting terminal part 330. One end of second coupling part 320 extends forward along the peripheral surface of capacitor element 100, and the other end of second coupling part 320 extends upward and then extends forward by being bended at a substantially right angle. Second connecting terminal part 330 has a circular plate shape, is formed so as to hang down from a front end of second coupling part 320, and has front and rear surfaces directed in the front-rear direction. Circular attachment hole 331 is formed in second connecting terminal part 330 so as to pass through both the front and rear surfaces.

Case 400 is formed from a resin such as a polyphenylene sulfide (PPS) resin, and has case body 410 whose upper surface is opened, and terminal installation part 420 that is integrally formed with case body 410 in front of case body 410.

Case body 410 has a rectangular parallelepiped box shape with a slightly longer lateral length, and has a corner between a front surface and a bottom surface and a corner between a rear surface and the bottom surface that are formed in a largely curved surface, conforming with a shape of capacitor element 100 to be accommodated.

Terminal installation part 420 has a rectangular parallelepiped box shape with a longer lateral length, and has upper surface 420a that has the same height as that of opening surface 410a of case body 410. First insert nut 421 and second insert nut 422 are respectively disposed in a left part and a right part of front surface 420b of terminal installation part 420. In terminal installation part 420, first insertion hole 421a and second insertion hole 422a are provided from front surface 420b toward the rear, to embed first insert nut 421 and second insert nut 422 into first insertion hole 421a and second insertion hole 422a, respectively.

First connecting terminal part 230 of first bus bar 200 and second connecting terminal part 330 of second bus bar 300 are installed on front surface 420b of terminal installation part 420. Attachment hole 231 of first connecting terminal part 230 matches a screw hole of first insert nut 421, and attachment hole 331 of second connecting terminal part 330 matches a screw hole of second insert nut 422. First connecting terminal part 230 and second connecting terminal part 330 are respectively connected to external terminals (not illustrated) by being screwed to first insert nut 421 and second insert nut 422.

First protrusion 423 and second protrusion 424 each of which protrudes upward and has a substantially columnar shape are respectively formed in a left part and a right part of upper surface 420a of terminal installation part 420. On the other hand, first fitting part 221 into which first protrusion 423 is fitted is formed at a slightly rear part from the front end of first coupling part 220 of first bus bar 200. And second fitting part 321 into which second protrusion 424 is fitted is formed at a slightly rear part from the front end of second coupling part 320 of second bus bar 300. By fitting first protrusion 423 into first fitting part 221, first bus bar 200 is positioned with respect to case 400 to be fixed in longitudinal and lateral directions. And by fitting second protrusion 424 into second fitting part 321, second bus bar 300 is positioned with respect to case 400 to be fixed in the longitudinal and lateral directions (refer to FIG. 1A). Note that, at this time, lower surface 220b of first coupling part 220 faces upper surface 420a of terminal installation part 420 so as to be brought into contact with upper surface 420a. Further, lower surface 320b of second coupling part 320 faces upper surface 420a of terminal installation part 420 so as to be brought into contact with upper surface 420a.

Distal end parts of first protrusion 423 and second protrusion 424 are formed into a tapered shape to facilitate first protrusion 423 and second protrusion 424 to be inserted into first fitting part 221 and second fitting part 321, respectively.

As illustrated in FIG. 3A, an R surface (a curved surface with a constant radius of curvature) is formed on an external surface of a part of first protrusion 423. The part of first protrusion 423 is closer to upper surface 420a of terminal installation part 420. Accordingly, an outer periphery of root part 423a of first protrusion 423 is gradually increased toward upper surface 420a of terminal installation part 420. Similarly, as illustrated in FIG. 3B, an R surface is formed on an external surface of a part of second protrusion 424. The part of second protrusion 424 is closer to upper surface 420a of terminal installation part 420. Accordingly, an outer periphery of root part 424a of second protrusion 424 is gradually increased toward upper surface 420a of terminal installation part 420.

First fitting part 221 includes through hole 222 passing through from upper surface 220a to lower surface 220b of first coupling part 220, and flange part 223 formed on upper surface 220a so as to rise from a peripheral edge of through hole 222. Flange part 223 has a cylindrical shape surrounding through hole 222. First fitting part 221 is a so-called burring hole formed by a burring machining method. A height of flange part 223 is greater than a thickness of first coupling part 220, that is, first bus bar 200. As illustrated in FIG. 3A, an R surface is formed at a portion of through hole 222 closer to lower surface 220b of first coupling part 220 (on an inner peripheral surface of through hole 222). Therefore, an inner periphery (hole diameter) of through hole 222 is gradually increased toward lower surface 220b of first coupling part 220.

Similarly, second fitting part 321 includes through hole 322 passing through from upper surface 320a to lower surface 320b of second coupling part 320, and flange part 323 formed on upper surface 320a so as to rise from a peripheral edge of through hole 322. Flange part 323 has a cylindrical shape surrounding through hole 322. Second fitting part 321 is a so-called burring hole formed by a burring machining method. A height of flange part 323 is greater than a thickness of second coupling part 320, that is, second bus bar 300. As illustrated in FIG. 3B, an R surface is formed at a portion of through hole 322 closer to lower surface 320b of second coupling part 320 (on an inner peripheral surface of through hole 322). Therefore, an inner periphery (hole diameter) of through hole 322 is gradually increased toward lower surface 320b of second coupling part 320.

A radius of curvature of the R surface of first fitting part 221 closer to through hole 222 is greater than a radius of curvature of the R surface of first protrusion 423 closer to root part 423a. And a radius of curvature of the R surface of second fitting part 321 closer to through hole 322 is greater than a radius of curvature of the R surface of second protrusion 424 closer to root part 424a. When first protrusion 423 is fitted into first fitting part 221, a distal end of first protrusion 423 extends outward from flange part 223. When second protrusion 424 is fitted into second fitting part 321, a distal end of second protrusion 424 extends outward from flange part 323.

Effects of Exemplary Embodiment

The present exemplary embodiment exerts the following effects.

First protrusion 423 (second protrusion 424) is fitted into first fitting part 221 (second fitting part 321). This can position first bus bar 200 (second bus bar 300) with respect to case 400 in the longitudinal and lateral directions. Further, flange part 223 (323) is formed in first fitting part 221 (second fitting part 321). Furthermore, a cross-sectional area of flange part 223 (323), which is shown as hatched portions in FIG. 4A, can compensate a reduction of a cross-sectional area of first bus bar 200 (second bus bar 300) in a plane parallel with a width direction (a direction perpendicular to the current flowing direction) due to through hole 222 (322) in first fitting part 221 (second fitting part 321). With this configuration, an increase in electric resistance value of first bus bar 200 (second bus bar 300) at a position of first fitting part 221 (second fitting part 321) can be suppressed, and a current can adequately pass through first bus bar 200 (second bus bar 300).

Figure 4A:
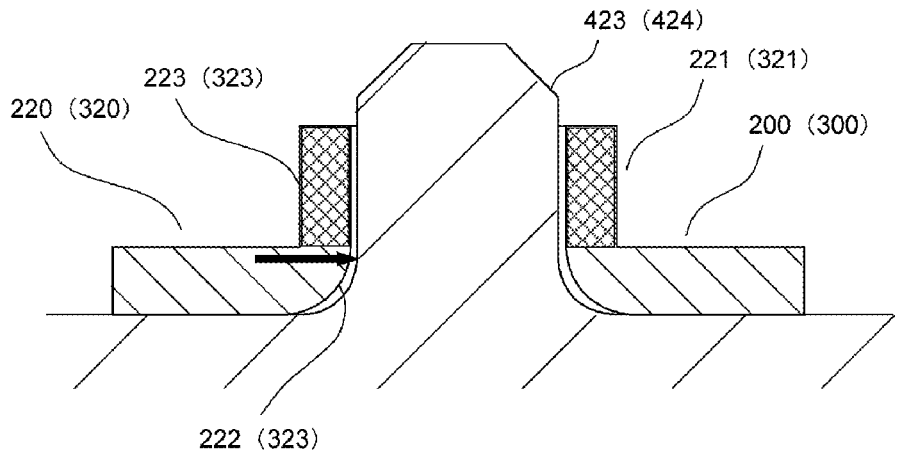
FIG. 4A to FIG. 4C are views describing effects of the film capacitor according to the present exemplary embodiment in comparison with a conventional film capacitor.
Figure 4B:
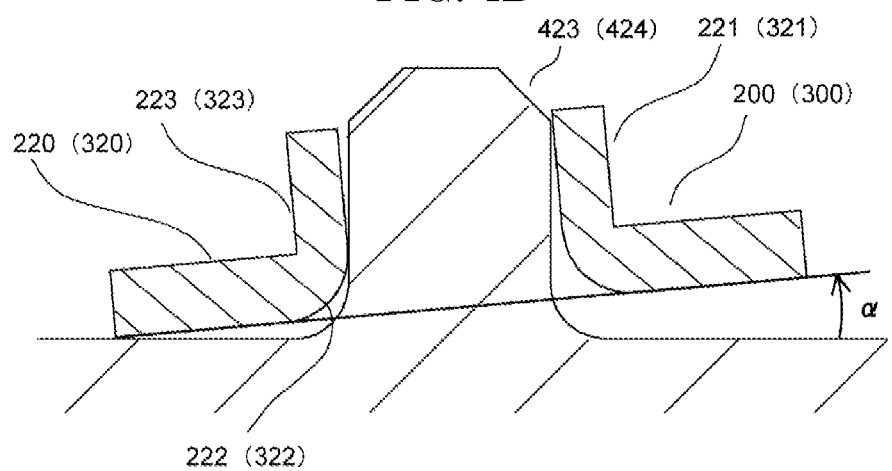
Figure 4C:
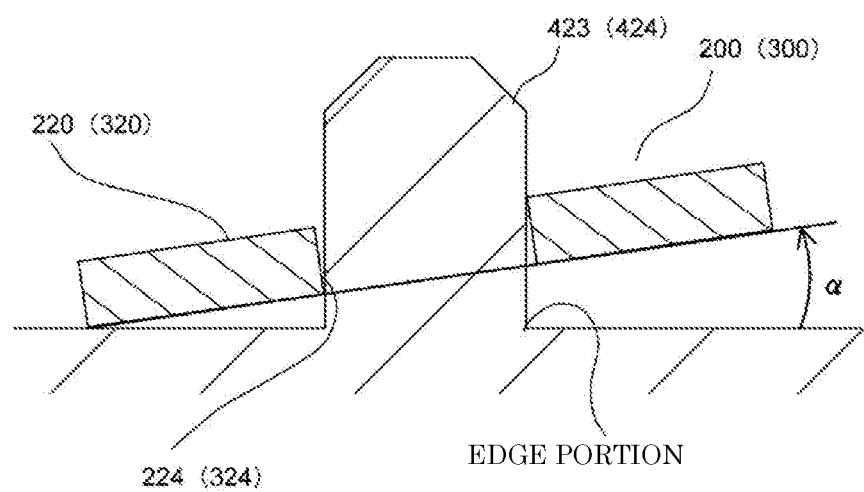

In general, a slight clearance (gap) is formed between first protrusion 423 (second protrusion 424) and first fitting part 221 (second fitting part 321) when those parts are fitted into each other. First protrusion 423 (second protrusion 424) can then incline with respect to first fitting part 221 (second fitting part 321) in a vertical direction. However, in the present exemplary embodiment, flange part 223 (323) formed in first fitting part 221 (second fitting part 321) increases a length of a portion of first fitting part 221 (second fitting part 321) along first protrusion 423 (second protrusion 424). This can reduce inclination angle α of first bus bar 200 (second bus bar 300) as illustrated in FIG. 4B, in comparison with a case where first fitting part 224 (second fitting part 324) is configured with only a through hole as illustrated in FIG. 4C. This can prevent occurrence of a positional shift between attachment hole 231 (331) of first connecting terminal part 230 (second connecting terminal part 330) and the screw hole of first insert nut 421 (second insert nut 422) of terminal installation part 420, for example.

Through hole 222 (322) of first fitting part 221 (second fitting part 321) has a shape in which the inner periphery of through hole 222 (322) is gradually increased toward lower surface 220b (320b) of first coupling part 220 (second coupling part 320). First protrusion 423 (second protrusion 424) is thus allowed to be easily inserted into first fitting part 221 (second fitting part 321).

By utilizing a space produced by through hole 222 (322) having gradually increased inner periphery, first protrusion 423 (second protrusion 424) has a shape in which an outer periphery of root part 423a (424a) of first protrusion 423 (second protrusion 424) is gradually increased toward upper surface 420a of terminal installation part 420. Therefore, root part 423a (424a) of first protrusion 423 (second protrusion 424) can be reinforced. With this configuration, when first connecting terminal part 230 (second connecting terminal part 330) and the external terminal are screwed to terminal installation part 420, first protrusion 423 (second protrusion 424) is hardly damaged even though external force that shears first protrusion 423 (second protrusion 424), which is shown as an arrow in FIG. 4A, is generated through first bus bar 200 (second bus bar 300). In particular, unlike a configuration as illustrated in FIG. 4C, in which first protrusion 423 (second protrusion 424) does not become thick at a root part, an edge is not formed between root part 423a (424a) and upper surface 420a of terminal installation part 420. Accordingly, the configuration of the present disclosure can prevent damage to first protrusion 423 (second protrusion 424), which is caused by stress concentration being generated at the edge.

Furthermore, the radius of curvature of the R surface of through hole 222 (322) of first fitting part 221 (second fitting part 321) is greater than the radius of curvature of the R surface of first protrusion 423 (second protrusion 424). Hence, lower surface 220b (320b) of first coupling part 220 (second coupling part 320) can be reliably brought into contact with upper surface 420a of terminal installation part 420.

Furthermore, when first protrusion 423 (second protrusion 424) is fitted into first fitting part 221 (second fitting part 321), the distal end of first protrusion 423 (second protrusion 424) is configured to extend outward from flange part 223 (323), so that first fitting part 221 (second fitting part 321) is hardly released from first protrusion 423 (second protrusion 424).

Variations

Although the exemplary embodiment of the present disclosure has been described above, the present disclosure is not limited to the exemplary embodiment described above, and moreover, many variations can be applied to application examples according to the present disclosure besides the exemplary embodiment described above.

For example, in the above-described exemplary embodiment, first protrusion 423 and second protrusion 424 are formed in the substantially columnar shape. However, first protrusion 423 and second protrusion 424 may be formed in any shape, and may be formed in a substantially square prismatic shape, for example.

Furthermore, in the above-described exemplary embodiment, through hole 222 (322) of first fitting part 221 (second fitting part 321) has the shape in which the inner periphery of through hole 222 (322) is gradually increased toward lower surface 220b (320b) of first coupling part 220 (second coupling part 320) over an entire depth of through hole 222 (322). However, through hole 222 (322) may have a shape in which the inner periphery of through hole 222 (322) is increased from the middle of through hole 222 (322).

In the above-described exemplary embodiment, the R surface (curved surface) is formed at the portion of through hole 222 (322) closer to lower surface 220b (320b) of first coupling part 220 (second coupling part 320). However, a C surface (flat surface) may be formed, in place of such an R surface (curved surface). Similarly, a C surface (flat surface) may be formed between first protrusion 423 (second protrusion 424) and upper surface 420a of terminal installation part 420, in place of the R surface (curved surface).

Furthermore, in the above-described exemplary embodiment, first connecting terminal part 230 (second connecting terminal part 330) is formed so as to hang down from the front end of first coupling part 220 (second coupling part 320). However, first connecting terminal part 230 (second connecting terminal part 330) may be formed so as to extend forward from first coupling part 220 (second coupling part 320). In this case, terminal installation part 420 may be extended conforming with first connecting terminal part 230 (second connecting terminal part 330), and first insert nut 421 (second insert nut 422) may be disposed on an upper surface of an extended portion. Alternatively, terminal installation part 420 may not be extended, and first insert nut 421 (second insert nut 422) may be omitted from front surface 420b of terminal installation part 420. In this case, first connecting terminal part 230 (second connecting terminal part 330) and the external terminal are coupled by a screw.

Furthermore, in the above-described exemplary embodiment, one capacitor element 100 is included in capacitor element unit U. However, a plurality of capacitor elements 100 may be included in capacitor element unit U.

Furthermore, capacitor element 100 is formed by stacking two metalized films that are dielectric films on which aluminum is deposited, and winding or laminating two stacked metalized film. However, in addition to this configuration, capacitor element 100 may be formed by stacking an insulator film and a metalized film that is a dielectric film whose both surfaces are deposited with aluminum, and winding or laminating this stacked material.

Furthermore, in the above-described exemplary embodiment, film capacitor 1 is used as an example of a capacitor of the present disclosure. However, the present disclosure can be applied to a capacitor other than film capacitor 1.

In addition, many variations can be made to the exemplary embodiment of the present disclosure as appropriate within the scope of the technical idea disclosed in the appended claims.

It should be noted that, in the description of the above-described exemplary embodiment, a term indicating a direction, such as "upward" or "downward", indicates a relative direction that only depends on a relative positional relationship of constituent members, and does not indicate an absolute direction, such as a vertical direction or a horizontal direction.

The present disclosure is useful for a film capacitor used in various electronic devices, electric devices, industrial devices, vehicular electrical equipment, and the like.

What is claimed is:

1. A capacitor comprising:
    a capacitor element;
    a bus bar electrically connected to the capacitor element; and
    a case that accommodates the capacitor element and the bus bar,
    wherein:
    the case has a protrusion,
    the bus bar includes a fitting part into which the protrusion is fitted, and has a first surface facing the case and a second surface opposite to the first surface,
    the fitting part includes:
        a through hole that passes through from the first surface to the second surface, and
        a cylindrical flange part disposed on the second surface so as to rise from a peripheral edge of the through hole and to surround the through hole,
    the through hole has an inner periphery gradually increasing toward the first surface,
    the protrusion is disposed on a forming surface of the case, and includes a root part having an outer periphery gradually increasing toward the forming surface,
    an inner surface of the through hole has a curved surface at a side close to the first surface so that the through hole has the inner periphery gradually increasing toward the first surface,
    an outer surface of the protrusion has a curved surface at a side close to the forming surface so that the protrusion includes the root part having the outer periphery gradually increasing toward the forming surface, and
    a radius of curvature of the curved surface of the through hole is greater than a radius of curvature of the curved surface of the protrusion.

2. The capacitor according to claim 1, wherein the protrusion has a distal end extending outward from the cylindrical flange part.

* * * * *